United States Patent
Saam et al.

[15] 3,678,126
[45] July 18, 1972

[54] SILOXANE CONTAINING THERMOPLASTIC ELASTOMERS

[72] Inventors: John C. Saam; Frederick W. G. Fearon, both of Midland, Mich.

[73] Assignee: Dow Corning Corporation, Midland, Mich.

[22] Filed: Aug. 25, 1970

[21] Appl. No.: 66,893

[52] U.S. Cl..................260/827, 55/522, 117/161 ZA, 260/23 S, 260/33.6 SB, 260/93.5 R
[51] Int. Cl. ...................................C08g 47/10, C08f 33/08
[58] Field of Search..................................260/827

[56] References Cited

UNITED STATES PATENTS

| | | | |
|---|---|---|---|
| 3,483,270 | 12/1969 | Bostick | 260/827 |
| 3,051,684 | 8/1962 | Morton et al. | 260/827 |
| 3,187,031 | 6/1965 | Weyenberg | 260/827 |
| 3,187,032 | 6/1965 | Weyenberg | 260/827 |
| 3,576,904 | 4/1971 | Saam et al. | 260/827 |

FOREIGN PATENTS OR APPLICATIONS

| | | | |
|---|---|---|---|
| 1,915,789 | 10/1969 | Germany | 260/827 |

*Primary Examiner*—Sanuel H. Blech
*Attorney*—Robert F. Fleming, Jr., Laurence H. Hobey, Harry D. Dingman and Roger H. Borrousch

[57] ABSTRACT

Block copolymers of polydiorganosiloxane blocks and polystyrene blocks are thermoplastic elastomers useful as coating materials and film formers with gas permeability.

7 Claims, No Drawings

SILOXANE CONTAINING THERMOPLASTIC ELASTOMERS

This invention relates to block copolymers which are thermoplastic elastomers.

Block copolymers of various kinds are known in the polymer art. Each of the block copolymers described in the art are said to have some special advantage or property. It is an object of this invention to provide a block copolymer which is a thermoplastic elastomer. This object and others will become apparent from the following detailed description of the present invention.

This invention relates to a thermoplastic-elastomer consisting essentially of a block copolymer of the formula

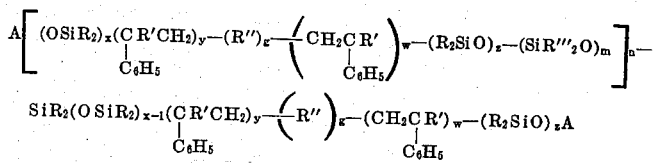

in which each R is a monovalent radical selected from the group consisting of methyl, ethyl, phenyl and vinyl, each R' is selected from the group consisting of a hydrogen atom and a methyl radical, R'' is a divalent hydrocarbon radical having from two to 30 inclusive carbon atoms, each R''' is a monovalent radical selected from the group consisting of methyl, ethyl, propyl, butyl, phenyl and 3,3,3-trifluoropropyl, each A is a monovalent radical selected from the group consisting of a hydrogen atom and $R_3Si-$ radicals, $m$ is an integer of from 0 to 1 inclusive, $w$ and $y$ have a value such that the molecular weight of

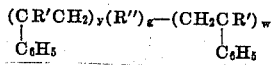

is greater than 7000, $x$ and $z$ have a value such that the block copolymer has 65 to 85 inclusive weight percent $R_2SiO$, $g$ is an integer of from 0 to 1 inclusive, and $n$ has a value greater than 1, there being present less than 5 weight percent free polydiorganosiloxane and there being present less than 10 weight percent free polystyrene.

The block copolymers of the present invention can be prepared by polymerizing styrene or alpha-methyl styrene or mixtures thereof in an organic solvent solution with a dilithium organic compound of the formula $(R'')Li_2$ where $R''$ is a divalent hydrocarbon radical having from two to 30 inclusive carbon atoms such as illustrated in the following compounds such as dilithiostilbene, 1,4-dilithiobenzene, 1,5-dilithiopentane, 1,5-dilithionaphthalene and 1,2-dilithio-1,3,3-triphenylpropane. The amount of dilithium organic compound used per amount of vinyl containing organic monomer will determine the size of the organic block. The smaller the amount of dilithium organic compound per given amount of styrene or alpha-methylstyrene, the greater the number of polymerized styrene or alpha-methylstyrene units in the resulting polymer. The amount of the dilithium organic compound used can be readily approximated by taking the value obtained by dividing the weight of the styrene or alpha methylstyrene to be used by the molecular weight of the polystyrene or poly-alpha-methylstyrene block desired. The results provide the number of moles of dilithium organic compound which is to be used. Since the reaction goes to almost 100 percent conversion and if the undesirable impurities have been carefully removed, the number average molecular weight obtained will be very close to the desired molecular weight used in determining the number of moles of dilithium organic compound to be used. It is to be understood that under certain conditions the results can deviate somewhat from those calculated, since the percent conversion can vary.

The reaction between the dilithium organic compound and the styrene and alpha-methylstyrene should be carried out under conditions free from contaminations such as water, air, oxygen, inhibitors, acidic impurities, greases and the like. The mixture of styrene or alpha-methylstyrene and the dilithium organic compound in solvent solution are maintained at a temperature between the reflux temperature of the mixture and the freezing point of the mixture until the styrene or alpha-methylstyrene has polymerized. When alpha-methylstyrene is the major monomer to be used, it is desirable to carry out the polymerization below $-40°$ C. and thereafter to add small amounts of styrene and continue the polymerization to provide small polystyrene segments on the poly-alpha-methylstyrene. Since the hexaorganocyclotrisiloxane does not readily polymerize with the lithium ended polymers below $-40°$ C. and since the lithium ended poly-alpha-methylstyrene tends to depolymerize above $-40°$ C., the small segments of polystyrene on the poly-alpha-methylstyrene allow the reaction mixture to be warmed above $-40°$ C. without depolymerization. Further details describing this method can be found in our copending application filed concurrently herewith Ser. No. 66,891, filed Aug. 25, 1970, and entitled "A Method of Preparing a Block Copolymer Containing a Poly-Alpha-Methylstyrene Block and a Polydiorganosiloxane Block and Block Copolymers Prepared Thereby".

The reaction product from the reaction of the dilithium organic compound and styrene, for example, is a lithium terminated polymer of the following formula

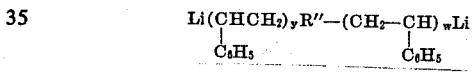

wherein $y$ and $w$ are the number of styrene units in the polymer and $R''$ is the residue from the dilithium organic compound. In this case $g$ is 1. When the electron transfer polymerization method is used to polymerize the styrene or alpha-methylstyrene, $g$ is 0 since no residue results in the polymeric product. The electron transfer polymerization methods well known in the art as described in U.S. Pat. Nos. 2,985,594; 3,134,745 and 3,458,491 are hereby incorporated by reference to describe the process.

To the lithium terminated polymer solution, hexaorganocyclotrisiloxane in solvent solution is added in an amount sufficient to provide at least one hexaorganocyclotrisiloxane molecule per each lithium end. The addition should be carried out so that there is no exposure to previously stated impurities. The resulting product would be, for the most part, a polymer of the formula wherein styrene is used for illustrative purposes,

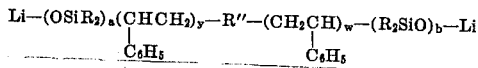

where R, R'', $y$ and $w$ are defined above and $a$ and $b$ are each from 1 to 3 inclusive. The reaction is held at a temperature between $-50°$ C. and no greater than the reflux temperature of the mixture. After sufficient time has elapsed, which is at least 30 minutes to 4 hours and which is recognizable by the disappearance of the color characteristic for lithium ended organic polymers, additional hexaorganocyclotrisiloxane in solvent solution and a polymerization promoter preferably in an amount of at least one weight percent based on the weight of the mixture is added to the lithium ended silicon-containing copolymer. Hexaorganocyclotrisiloxane is added in an amount necessary to provide the desired siloxane block size such that the block copolymer contains from 65 to 85 weight percent $R_2SiO$ units. The reaction mixture is preferably heated to reflux for 3 to 4 hours to increase the reaction rate. The reaction, however, can be carried out between $-50°$ C. and the reflux temperature of the mixture for at least 30 minutes or greater. The resulting product has a formula

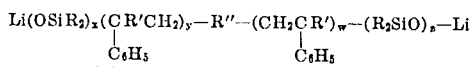

where R, R', R'', y and w are defined above and x and z have values such that the block copolymer has from 65 to 85 weight percent $R_2SiO$ units. The lithium ended block copolymer can be condensed directly, terminated with silanols by reaction with a protonic material such as acetic acid and then condensed or by reaction with $R'''_2SiCl_2$. This lithium ended block copolymer is then reacted with sufficient $R'''_2SiCl_2$ to couple the molecules of block copolymer together and increase the molecular weight sufficiently to provide a block copolymer of the formula

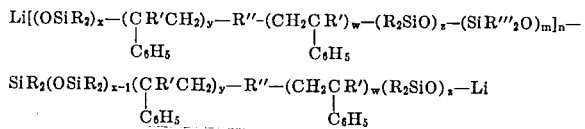

where R, R', R'', y, w, x and z are defined above, n has a value greater than 1, m is 0 or 1, and each R''' is a monovalent radical of methyl, ethyl, propyl, butyl, phenyl or 3,3,3-trifluoropropyl. The lithium atoms in this polymer can be replaced by hydrogen atoms by washing the polymer with water and at the same time removing the lithium chloride formed or acetic acid can be added to replace the lithium atoms with hydrogen atoms. If triorganosilyl ended polymers are desired, $R_3SiCl$ can be added wherein the lithium atoms are replaced by $R_3Si-$ groups.

The $R'''_2SiCl_2$ compounds can be illustrated by dimethyldichlorosilane, methylphenyldichlorosilane, methyl-3,3,3-trifluoropropyldichlorosilane, ethylmethyldichlorosilane, diethyldichlorosilane, butylmethyldichlorosilane and the like.

The styrene, alpha-methylstyrene and the organic solvents should be washed, dried and/or distilled prior to use to remove any impurities such as water, inhibitors and the like. Suitable organic solvents include the hydrocarbon solvents which are solvents for the styrene and alpha-methylstyrene, such as cyclohexane, toluene, benzene, n-hexane, mineral spirits, methylcyclohexane, xylene, n-butane, n-heptane, isooctane and cyclopentane.

The organic solvent for the solution of the hexaorganocyclotrisiloxane can be any of those stated above for use during the polymerization of the styrene and alpha-methylstyrene. The polymerization promoter can be, for example, tetrahydrofuran and bis(2-methoxyethyl)ether.

In the block copolymer of the present invention, R can be methyl, ethyl, phenyl or vinyl. The diorganosiloxane units, therefore, can be illustrated by dimethylsiloxane, diphenylsiloxane, methylphenylsiloxane, diethylsiloxane, ethylmethylsiloxane and methylvinylsiloxane. Preferably, R is methyl.

When A is a triorganosilyl group, $R_3Si-$, triorganochlorosilanes are conveniently used to endblock the block copolymers. Illustrative of these triorganochlorosilanes are trimethylchlorosilane, phenyldimethylchlorosilane, methylphenylvinylchlorosilane, dimethylvinylchlorosilane, dimethylethylchlorosilane and the like.

The block copolymers of the present invention are thermoplastic-elastomers. These materials have good elastomeric properties at room temperature in the uncured state, however, upon heating to a temperature such as 80° to 100° C. the material becomes thermoplastic. Therefore, these thermoplastic elastomers are elastomers at temperatures from below room temperature to some temperature above 50° C. in the uncured and unfilled state. The thermoplastic-elastomers can be fabricated in the same manner as ordinary thermoplastics, since they are organic solvent soluble, have softening and melting ranges. These thermoplastic elastomers can readily be fabricated and molded at temperatures above 150° C. or at lower temperatures from solutions. Since these thermoplastic elastomers do not need to be cured to obtain their excellent properties, they can be put into solution or molded repeatedly without loss of property. These thermoplastic elastomers are gas permeable and film formers and thus, gas permeable membranes can be made from them. The thermoplastic-elastomers have good electrical properties and good weatherability. These properties provide excellent elastomeric protective coatings and electrical insulation which can be applied from the polymer melt or solution.

The thermoplastic-elastomers rapidly lose their elastomeric property when the polymer mixture contains 5 weight percent or more free polydiorganosiloxane or contains 10 weight percent or more free polystyrene or poly-alpha-methylstyrene. Therefore, the thermoplastic-elastomers of the present invention must have less than 5 weight percent free polystyrene or poly-alpha-methylstyrene. Free copolymers of styrene and alpha-methylstyrene are also considered within these limitations.

The following examples are illustrative only and should not be construed as limiting the present invention which is properly delineated in the claims.

EXAMPLE 1

A solution of 0.0133 moles of dilithiostilbene in 26.6 ml. of tetrahydrofuran was added to a solution of 180 g. of purified styrene in 800 ml. of pure dry benzene in a dry nitrogen atmosphere. The temperature of the polymerization was held at 25° to 30° C. with cooling. After two hours a one-fourth aliquot of a dry solution of 420 g. hexamethylcyclotrisiloxane in 2,100 ml. of purified toluene was added without exposure to the atmosphere. The highly viscous mixture was vigorously stirred until the characteristic orange color of the "living" polymer disappeared. At this point the mixture passes through a thick gel phase and then forms a highly viscous solution. The remaining hexamethylcyclotrisiloxane solution was added, followed by 150 ml. of purified $(CH_3OCH_2CH_2)_2O$. After 8 hours polymerization, the resulting polymer had a formula

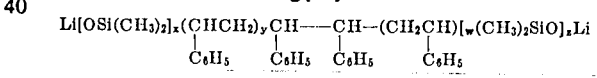

with a molecular weight as determined by membrane osmometry of 45,100 (calculated $M_n = 45,000$), the sum of y and w was about 130 and 32.6 weight percent was polystyrene blocks and 67.4 weight percent was polydimethylsiloxane blocks. To the solution of the above block copolymer, 2.16 ml. of $CF_3CH_2CH_2(CH_3)SiCl_2$ was added with agitation. After 18 hours the solution was filtered, washed with water and the solvent was removed in a vacuum at 80° C. The molecular weight of the resulting block copolymer was 257,000 by membrane osmometry, and the formula was

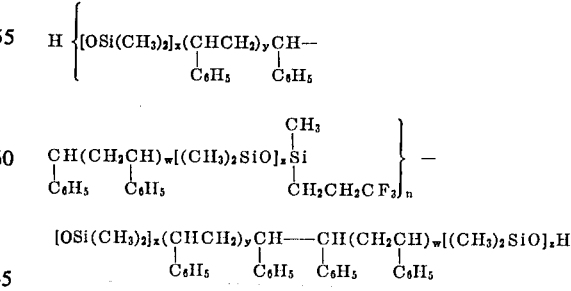

where n was 4.7. The tensile strength at break of the above block copolymer on compression molded test bars was 1,300 p.s.i., the elongation at break was 490 percent and the Die B tear strength was 190 p.l.i. The thermoplastic-elastomer had a tensile strength at yield of 240 p.s.i. and an elongation at yield of 3 percent with only a small tension set.

EXAMPLE 2

The procedure of Example 1 was used to prepare block copolymers as defined by the formula describing the condensed block copolymer. The properties of these block copolymers were as shown in Table I.

TABLE I

| No. | Sum Molecular $y + w$ | $n$ | Wt. | Wt. % Polystyrene Blocks | Tensile strength at breaks, p.s.i. | Elongation at break, % | Tear strength Die B p.l.i. |
| --- | --- | --- | --- | --- | --- | --- | --- |
| 1 | 38* | 2.3 | 39,930 | 33.0 | 240 | 120 | 37 |
| 2 | 74 | 1.2 | 56,540 | 29.9 | 400 | 150 | — |
| 3 | 74 | 2.6 | 92,520 | 29.9 | 700 | 360 | 137 |
| 4 | 107 | 1.7 | 98,820 | 30.3 | 680 | 410 | — |
| 5 | 118 | 2.2 | 131,840 | 29.9 | 1020 | 350 | 170 |

*For comparative purposes only.

The electrical properties for block copolymer No. 2 were as follows: a dielectric constant at $10^5$ Hertz of 2.63, a dissipation factor at $10^5$ Hertz of 0.00024, a volume resistivity of $1.3 \times 10^{15}$ ohm. -cm. and a dielectric strength of 530 volts/mil. The above block copolymers had a gas permeability for oxygen of $25 \times 10^{-9}$ cm$^3$-cm/cm$^2$-sec. cm Hg and for nitrogen of $11.1 \times 10^{-9}$ cm$^3$-cm/cm$^2$-sec cm Hg.

EXAMPLE 3

The following procedures were carried out by removing any water acidic materials, oxygen and inhibitors from the ingredients. A solution of 0.012 moles of dilithiostilbene in 20 ml. of tetrahydrofuran was added to a solution of 40 g. of alpha-methylstyrene in 500 ml. of tetrahydrofuran. The resulting solution was cooled to −70° C. and held at this temperature for 30 minutes during which time the alpha-methylstyrene was polymerized. To the resulting mixture, 4.55 g. of styrene was added. After 5 minutes, the styrene had polymerized. Thereafter, the mixture was allowed to warm to ambient temperature. No alpha-methylstyrene monomer was detected in the warmed mixture. To the warmed mixture, 140 g. of hexamethylcyclotrisiloxane in 515 ml. of benzene was added. After 4 hours 95 percent of the hexamethylcyclotrisiloxane was consumed. The polymerization was terminated with the addition of 5 ml. of acetic acid. The mixture was thereafter washed with 100 ml. of a 20 weight percent solution of sodium bicarbonate in water. The solution was washed with water until neutral and the block copolymer was then precipitated by adding the solution to 3,000 ml. of ethanol. The precipitated polymer was washed twice with ethanol and then dried at 40° C. and 1 mm of Hg for 24 hours. 156 g. of the block copolymer was recovered having 83 weight percent polydimethylsiloxane block and 17 weight percent polyalpha-methylstyrene-styrene block, based on silicon analysis. No free polydimethylsiloxane was found in the block copolymer.

To 50 g. of the above block copolymer in 500 ml. of cyclohexane, 0.5 ml. of stannous octoate was added. The solvent was removed and the resulting polymer was heated at 140° C. at 1 mm of Hg for 24 hours. The product was cooled, dissolved in 500 ml. of toluene and then precipitated by adding the toluene solution to 2,000 ml. of ethanol. The precipitated block copolymer was washed with ethanol and then dried at 40° C. at 1 mm of Hg for 24 hours. The product was a transparent elastomer.

EXAMPLE 4

The block copolymer of Example 1 was solvent fractionated into different molecular weight fractions. The various fractions and the physical properties of each fraction were as shown in Table II.

TABLE II

| Fraction | Molecular Wt. | $n$ | Wt. % Polydimethylsiloxane Blocks | Tensile Strength at break, p.s.i. | Elongation at break, % |
| --- | --- | --- | --- | --- | --- |
| 1** | 45,100 | 0 | 67.4 | 0 | 0 |
| 2 | 71,000 | 0.58 | 66.2 | 420 | 47 |
| 3 | 157,000 | 2.42 | 66.2 | 1030 | 500 |
| 4*** | 257,000 | 4.7 | 67.4 | 1300 | 490 |
| 5 | 396,000 | 7.75 | 65.0 | 1520 | 800 |
| 6 | 1,288,000 | 27.5 | 68.8 | 1860 | 1030 |
| 7 | 1,930,000 | 41.8 | 68.8 | 1760 | 950 |
| 8 | 2,575,000 | 56.0 | 66.2 | 2200 | 1290 |
| 9 | 3,091,000 | 67.0 | 66.2 | 1920 | 1150 |

**Uncondensed prepolymer.
***Unfractionated block copolymer.

That which is claimed is:

1. A thermoplastic-elastomer consisting essentially of a block copolymer of the formula

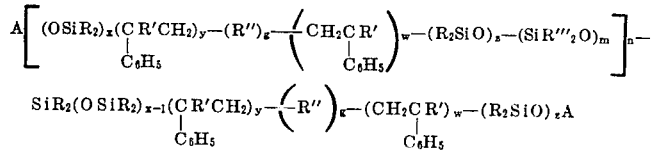

in which each R is a monovalent radical selected from the group consisting of methyl, ethyl, phenyl and vinyl, each R' is selected from the group consisting of a hydrogen atom and a methyl radical, R'' is a divalent hydrocarbon radical having from two to 30 inclusive carbon atoms, each R''' is a monovalent radical selected from the group consisting of methyl, ethyl, propyl, butyl, phenyl and 3,3,3-trifluoropropyl, each A is a monovalent radical selected from the group consisting of a hydrogen atom and $R_3Si-$ radicals, $m$ is an integer of from 0 to 1 inclusive, $w$ and $y$ have a value such that the molecular weight of is greater than 7,000, $x$ and $z$ have a value such that the block copolymer has 65 to 85 inclusive weight percent $R_2SiO$, $g$ is an integer of from 0 to 1 inclusive, and $n$ has a value greater than 1, there being present less than 5 weight percent free polydiorganosiloxane and there being present less than 10 weight percent free polystyrene.

2. The thermoplastic-elastomer in accordance with claim 1 in which R' is a hydrogen atom.

3. The thermoplastic-elastomer in accordance with claim 1 in which R' is a methyl radical.

4. The thermoplastic-elastomer in accordance with claim 2 in which R is a methyl radical and A is a hydrogen atom.

5. The thermoplastic-elastomer in accordance with claim 3 in which R is a methyl radical and A is a hydrogen atom.

6. The thermoplastic-elastomer in accordance with claim 4 in which $g$ is 1.

7. A gas permeable membrane consisting essentially of a film of the thermoplastic-elastomer according to claim 1.

* * * * *